No. 829,016. PATENTED AUG. 21, 1906.
E. A. JOHNSTON.
SUPPORTING MECHANISM FOR HARVESTER REELS.
APPLICATION FILED DEC. 28, 1905.
2 SHEETS—SHEET 2.
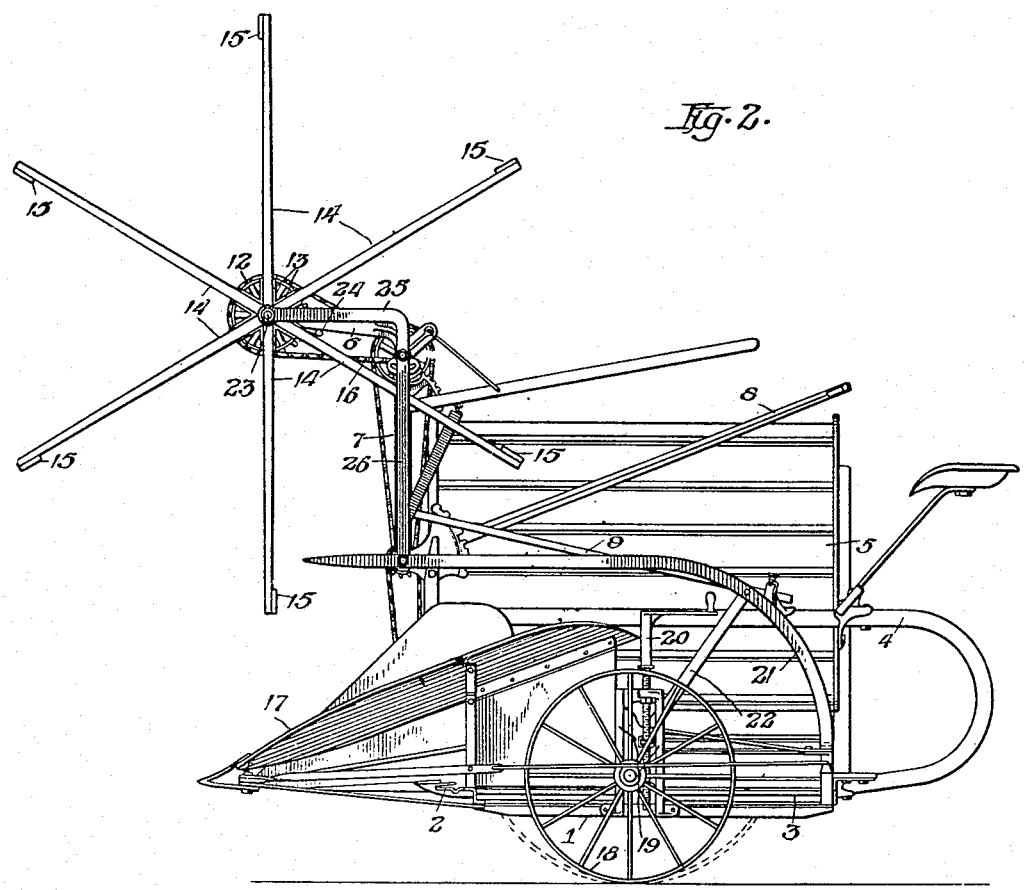
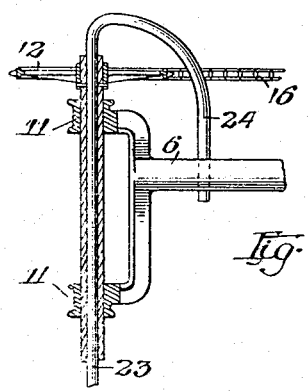

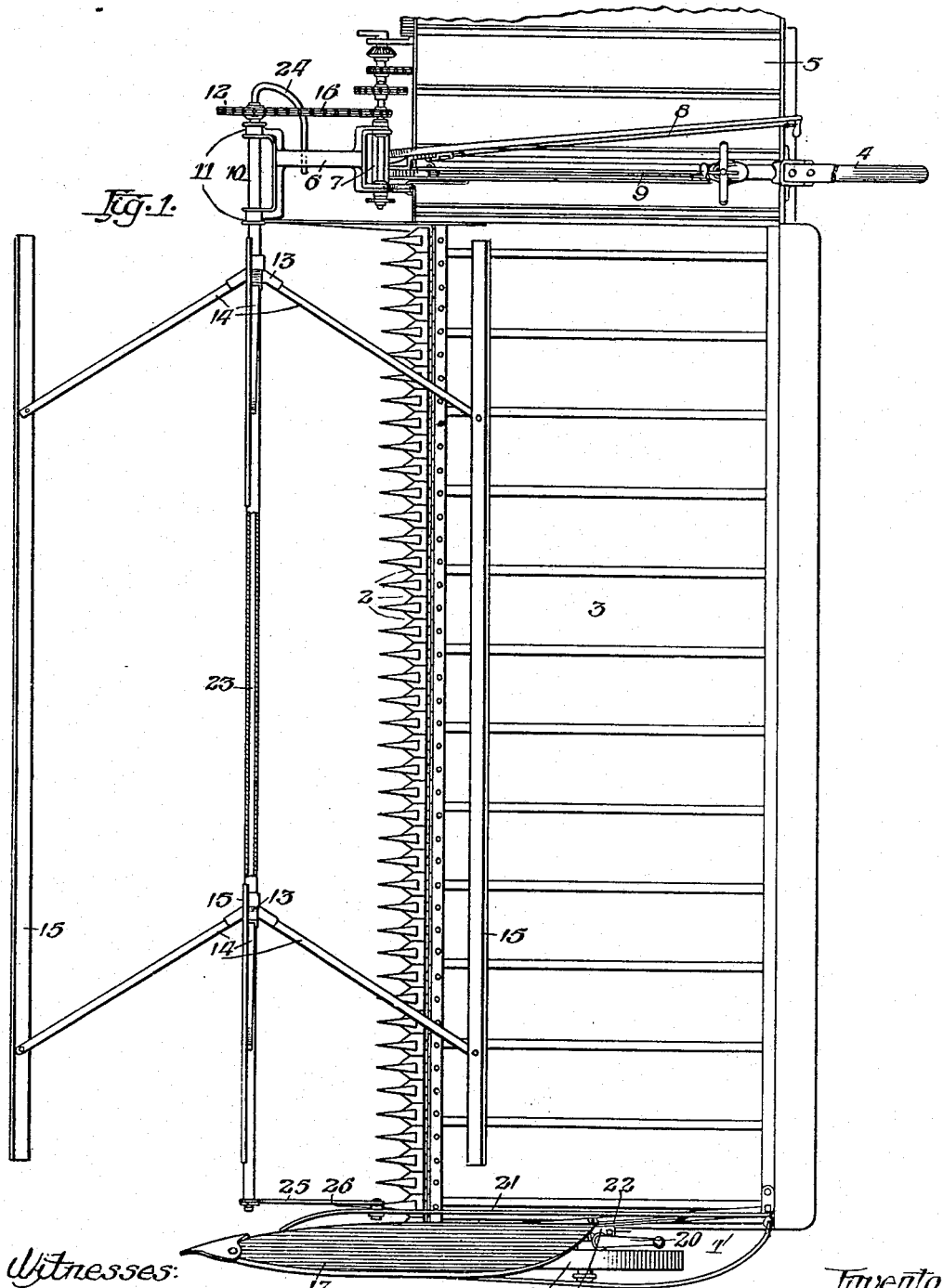

UNITED STATES PATENT OFFICE.

EDWARD A. JOHNSTON, OF STERLING, ILLINOIS, ASSIGNOR TO INTERNATIONAL HARVESTER COMPANY, A CORPORATION OF NEW JERSEY.

SUPPORTING MECHANISM FOR HARVESTER-REELS.

No. 829,016.     Specification of Letters Patent.     Patented Aug. 21, 1906.

Application filed December 28, 1905. Serial No. 293,594.

*To all whom it may concern:*

Be it known that I, EDWARD A. JOHNSTON, a citizen of the United States, residing at Sterling, in the county of Whiteside and State of Illinois, have invented certain new and useful Improvements in Supporting Mechanism for Harvester-Reels, of which the following is a specification, reference being had to the accompanying drawings, forming a part thereof.

My invention relates to supporting mechanism for harvester-reels, and is particularly designed to support the grainward end of the reel in grain-harvesters in what are usually called "wide-cut machines" or those having unusually long platforms and associated cutting mechanism, its object being to prevent the reel from sagging at its outer end and coming in contact with the cutting mechanism or carrier-apron and to provide such preventative means as will not obstruct a free passage of the cut grain to the carrier-apron and which will not necessitate the employment of additional means for adjusting the reel to its various operative positions.

To this end the invention consists in the various details of construction and combination of parts hereinafter particularly described and claimed.

In the accompanying drawings, illustrating my invention, Figure 1 is a plan view of the reel and its supporting mechanism and so much of a harvester sufficient to illustrate the application of my invention. Fig. 2 is an end view of Fig. 1 as viewed from the grainward end, and Fig. 3 is a detail of part of the supporting mechanism.

Referring to the drawings, 1 represents the grain-platform having the cutting apparatus 2 and the carrier-apron 3 associated therewith.

4 is a seat-supporting pipe; 5, a part of the elevator supported thereby.

The reel is supported by the seat-pipe and the elevator-frame by means of the jointed arms 6 and 7 in a common way, the arm 6 being pivotally connected with arm 7 and the latter to a fixed support and is adjustable in a fore-and-aft and vertical direction by means of the hand-operated lever 8 and the locking-bar 9 under the control of the operator's foot and comprises a tubular shaft 10, journaled in transverse bearings 11, forming part of the supporting-arm 6 and having a driving-sprocket 12 secured to one end thereof and reel-spiders 13 to its body portion, to which are secured reel-arms 14, having the reel-slats 15 secured to their outer ends. The reel derives motion by means of the sprocket-chain 16 and other suitable means, connecting it with the source of power.

17 is a common form of grain-divider attachment forming part of the grainward end of the platform, and 18 is a grain-wheel adjustable vertically relative to the platform in the bracket 19 by means of the crank-arm 20 in a well-known way. Secured to the rear part of the platform is a curved bar 21, having its forward end overhanging the platform in a fore-and-aft direction, and 22 is a supplemental support therefor connecting the bar with the wheel-supporting bracket 19.

Within the tubular shaft 10 is a shaft 23, secured against rotation by means of the rearwardly and grainwardly curved arm portion 24, engaging with the reel-supporting arm 6 and having its grainward end projecting beyond the tubular shaft, and secured thereto is one end of an arm 25, that is substantially equal in length to the arm 6 and is arranged substantially in the same plane, said arm 25 being pivotally connected at its opposite end with the upper end of a vertically-arranged bar 26, that is substantially equal in length to the arm 7, said arm 26 being pivotally connected at its lower end to the forward end of the curved bar 21 in a manner having the pivotal connection of the bars 25, 26, and 21 substantially in line with the pivotal connections of the arms 6 and 7 and that of the latter with the supporting means carried by the seat-supporting pipe and the elevator-frame. When the reel is adjusted in either a vertical or fore-and-aft direction by the operator, the arm 25 and the bar 26 will follow the movements of the arms 6 and 7 and be controlled thereby, and by reason of the torsional strength of the shaft 23 the grainward end of the reel is maintained at substantially the same level as the stubbleward end at all positions of adjustment thereof.

What I claim as my invention, and desire to secure by Letters Patent, is—

1. In a grain-harvester, the combination of a grain-platform, a reel comprising a hollow rotatable shaft, a reel-support at the stubbleward end of said shaft, comprising a vertically-arranged standard having its lower end pivotally connected with a fixed part of the machine and adapted to swing in a fore-and-aft direction relatively thereto, an arm arranged in a fore-and-aft direction relatively to the machine and having its rear end pivotally connected with the upper end of said standard in a manner permitting said arm to swing in a vertical plane, said reel-shaft journaled at the forward end of said arm, means for adjusting said standard and arm about their pivotal axes, a shaft inclosed by said hollow shaft and having one end connected with said reel-supporting arm in a manner to prevent rotation of said inclosed shaft, an arm having its forward end secured to the grainward end of said non-rotatable shaft and an arm having its lower end pivotally connected with a fixed part of the grain-platform, and its opposite end pivotally connected with the rear end of the arm secured to the non-rotatable shaft.

2. In a grain-harvester, the combination of a grain-platform, a reel comprising a hollow rotatable shaft, a reel-support at the stubbleward end of said shaft, comprising a vertically-arranged standard having its lower end pivotally connected with a fixed part of the machine and adapted to swing in a fore-and-aft direction relatively thereto, an arm arranged in a fore-and-aft direction relatively to the machine and having its rear end pivotally connected with the upper end of said standard in a manner permitting said arm to swing in a vertical plane, said reel-shaft journaled at the forward end of said arm, means for adjusting said arm and standard about their pivotal axes, a shaft inclosed by said hollow shaft and having one end connected with said reel-supporting arm in a manner to prevent rotation of said inclosed shaft, an arm having its forward end secured to the grainward end of said non-rotatable shaft, a vertically-arranged arm having its lower end pivotally connected with a fixed part of said grain-platform and its upper end pivotally connected with the rear end of said arm secured to said non-rotatable shaft, the axes of said pivotal connections being substantially in line with the axes of the pivotal connections of the arm and standard at the stubbleward end of said reel-shaft.

3. In a grain-harvester, the combination of a grain-platform, a reel comprising a hollow rotatable shaft, a reel-support at the stubbleward end of said shaft, comprising a vertically-arranged standard having its lower end pivotally connected with a fixed part of the machine and adapted to swing in a fore-and-aft direction relatively thereto, an arm arranged in a fore-and-aft direction relatively to the machine and having its rear end pivotally connected with the upper end of said standard in a manner permitting said arm to swing in a vertical plane, said reel-shaft journaled at the forward end of said arm, means for adjusting said arm and standard about their pivotal axes, a shaft inclosed by said hollow shaft and secured against rotation by having its stubbleward end bent rearward and grainward in a manner to engage with said arm, an arm having its forward end secured to the grainward end of said non-rotatable shaft, a vertically-arranged arm having its lower end pivotally connected with a fixed part of said grain-platform and its upper end pivotally connected with the rear end of said arm secured to said non-rotatable shaft, the axes of said pivotal connections being substantially in line with the axes of the pivotal connections of the arm and standard at the stubbleward end of said reel-shaft.

4. In a grain-harvester, the combination of a grain-platform, a reel comprising a hollow rotatable shaft, a two-part hinge-jointed reel-support pivotally connected with a fixed part of the machine at the stubbleward end of said grain-platform and having said reel-shaft journaled thereon and adapted to be adjusted in a vertical fore-and-aft direction thereby, a shaft inclosed by said hollow shaft and secured against rotation by means of a connection at its stubbleward end with said hinge-jointed reel-support, a two-part hinge-jointed support having one of its members pivotally connected with a fixed part of said grain-platform at its grainward end and its other member rigidly secured to said inclosed shaft, the axes of the corresponding joints and pivotal connections of the grainward and stubbleward supports being substantially coincident.

5. In a grain-harvester, the combination of a grain-platform, a reel comprising a hollow rotatable shaft, a reel-support at the stubbleward end of said shaft, comprising a vertically-arranged standard having its lower end pivotally connected with a fixed part of the machine and adapted to swing in a fore-and-aft direction relatively thereto, an arm arranged in a fore-and-aft direction relatively to the machine and having its rear end pivotally connected with the upper end of said standard in a manner permitting said arm to swing in a vertical plane, said reel-shaft journaled at the forward end of said arm, means for adjusting said arm and standard about their pivotal axes, a shaft inclosed by said hollow shaft and secured against rotation by means of a connection at its stubbleward end with said arm, a rearwardly-projecting arm having its forward end rigidly secured to the grainward end of said inclosed shaft, a bar having its rear end secured to the grain-platform and its forward end overhanging the same in a fore-and-aft direction, and a vertically-arranged bar pivotally connecting the overhanging end of said fore-and-aft bar with the rear end of the arm secured to the inclosed shaft, the axes of said pivotal connections being substantially in line with the axes of the pivotal connections of the arm and standard at the stubbleward end of said reel-shaft.

In witness whereof I hereto affix my signature in presence of two witnesses.

EDWARD A. JOHNSTON.

Witnesses:
FRED. A. WREY,
R. S. BUTLER.